(12) United States Patent
Agrawal et al.

(10) Patent No.: US 12,250,620 B2
(45) Date of Patent: Mar. 11, 2025

(54) SPEED-AWARE ADAPTATION OF VEHICLE COMMUNICATIONS NETWORKS

(71) Applicant: INTERNATIONAL BUSINESS MACHINES CORPORATION, Armonk, NY (US)

(72) Inventors: Tushar Agrawal, West Fargo, ND (US); Jeremy R. Fox, Georgetown, TX (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 17/817,340

(22) Filed: Aug. 3, 2022

(65) Prior Publication Data

US 2024/0049109 A1 Feb. 8, 2024

(51) Int. Cl.
*H04W 48/04* (2009.01)
*H04W 28/02* (2009.01)
*H04W 48/20* (2009.01)
*H04W 72/51* (2023.01)

(52) U.S. Cl.
CPC ....... *H04W 48/04* (2013.01); *H04W 28/0226* (2013.01); *H04W 48/20* (2013.01); *H04W 72/51* (2023.01)

(58) Field of Classification Search
CPC .......... H04W 4/029; H04W 76/50; H04W 36/008355; H04W 36/083; H04W 64/003
USPC .................................................. 455/418, 436
See application file for complete search history.

(56) References Cited

U.S. PATENT DOCUMENTS

| 8,145,199 | B2 * | 3/2012 | Tadayon | H04W 4/029 455/418 |
| 8,755,764 | B2 * | 6/2014 | Yi | H04W 76/50 342/450 |
| 8,903,593 | B1 | 12/2014 | Addepalli | |
| 9,124,703 | B2 * | 9/2015 | Tadayon | H04W 4/029 |

(Continued)

OTHER PUBLICATIONS

M. E. Mkiramweni, C. Yang, J. Li and W. Zhang, "A Survey of Game Theory in Unmanned Aerial Vehicles Communications," in IEEE Communications Surveys & Tutorials, vol. 21, No. 4, pp. 3386-3416, Fourthquarter 2019, doi: 10.1109/COMST.2019.2919613. (Year: 2019).*

(Continued)

*Primary Examiner* — William D Cumming
(74) *Attorney, Agent, or Firm* — Anthony R. Curro

(57) ABSTRACT

A computer-implemented method, a computer system and a computer program product adapt a vehicle communication network range based on an awareness of vehicle speed. The method includes identifying a plurality of devices within a recommended range of a vehicle. The method also includes obtaining a current driving environment from the plurality of devices. In addition, the method includes calculating a required range for a communications network based on the current driving environment and determining required devices within the required range. Lastly, the method includes dynamically creating the communications network when the required range is greater than the recommended range, where the communications network includes the vehicle, the plurality of devices within the recommended range and the required devices.

17 Claims, 2 Drawing Sheets

(56) References Cited

U.S. PATENT DOCUMENTS

| | | | |
|---|---|---|---|
| 9,230,441 | B2 | 1/2016 | Sung |
| 9,332,126 | B2 * | 5/2016 | Tadayon ................ H04M 3/53 |
| 9,723,473 | B2 * | 8/2017 | Shimizu ................ H04L 67/12 |
| 9,800,492 | B2 | 10/2017 | Stählin et al. |
| 10,030,981 | B2 | 7/2018 | Zhou |
| 10,107,889 | B2 * | 10/2018 | Va ............................ G01S 1/042 |
| 10,187,766 | B2 | 1/2019 | Lee |
| 10,223,134 | B1 | 3/2019 | Penilla |
| 10,330,486 | B2 | 6/2019 | Grimm |
| 10,475,267 | B2 * | 11/2019 | DeLong ................ B60R 25/20 |
| 10,713,613 | B2 * | 7/2020 | Hage ................ G01R 33/0206 |
| 10,723,317 | B2 | 7/2020 | Saleh |
| 11,062,157 | B2 * | 7/2021 | Lee ........................ G06V 20/59 |
| 11,099,264 | B2 | 8/2021 | Bhatia |
| 11,218,850 | B2 | 1/2022 | Liu |
| 11,228,882 | B2 * | 1/2022 | You ..................... H04W 64/003 |
| 11,271,633 | B2 * | 3/2022 | Park ....................... B61L 25/025 |
| 11,367,033 | B2 * | 6/2022 | Warkentin ............... G08G 1/20 |
| 11,395,203 | B2 * | 7/2022 | Logothetis ........... H04W 4/029 |
| 11,462,106 | B2 * | 10/2022 | Lang .................... G08G 1/0145 |
| 11,722,940 | B2 * | 8/2023 | Logothetis ........... H04W 48/16 |
| | | | 455/436 |
| 12,126,580 | B2 * | 10/2024 | Fang ........................ H04W 4/46 |
| 2010/0131816 | A1 | 5/2010 | Yamamoto |
| 2017/0111122 | A1 * | 4/2017 | Shimizu ................ H04W 4/80 |
| 2017/0299689 | A1 * | 10/2017 | Va ............................ G01S 1/042 |
| 2018/0077524 | A1 * | 3/2018 | Post ........................ G08G 1/22 |
| 2020/0012871 | A1 * | 1/2020 | Lee ..................... B60N 2/0273 |
| 2020/0252769 | A1 | 8/2020 | Alieiev |
| 2020/0296644 | A1 * | 9/2020 | Logothetis ............ H04W 4/029 |
| 2021/0201675 | A1 * | 7/2021 | Lang ................. G08G 1/09623 |
| 2021/0400449 | A1 | 12/2021 | Cheng |
| 2022/0131631 | A1 | 4/2022 | Abedini |
| 2022/0353768 | A1 * | 11/2022 | Logothetis ........ H04W 74/0833 |
| 2023/0048886 | A1 * | 2/2023 | Fang ....................... H04L 51/58 |
| 2023/0328476 | A1 * | 10/2023 | Archbold .............. H04W 12/50 |

OTHER PUBLICATIONS

Author Unknown, "Ultra-Wideband (UWB) Here's everything you need to know", https://bleesk.com/uwb.html, Bleesk, Accessed on May 20, 22, pp. 1-12.

Aygun et al., "ECPR : Environment-And Context-Aware Combined Power And Rate Distributed Congestion Control For Vehicular Communications", https://doi.org/10.48550/arXiv.1502.00054, Cornell University Library, Jun. 5, 2016, pp. 1-37.

Boban et al., "Exploring The Practical Limits Of Cooperative Awareness In Vehicular Communications", https://ieeexplore.ieee.org/document/7438929, TVT IEEE Transactions On, vol. 65, Issue 6, Jun. 2016.

Galeon, "A Camera That Sees Around Corners Could Help Improve Self-Driving Cars", https://futurism.com/a-camera-that-sees-around-corners-could-help-improve-self-driving-cars, Futurism, Oct. 10, 2017, pp. 1-6.

Haque et al., "LoRa Architecture For V2X Communication: An Experimental Evaluation With Vehicles On The Move", http://dx.doi.org/10.3390/s20236876, Sensors, vol. 20, Issue 23, Dec. 1, 2020, pp. 1-26.

IBM, "IBM IoT Connected Vehicle Insights", https://www.ibm.com/products/iot-for-automotive, Accessed on May 20, 2022. pp. 1-7.

IBM, "Smart city technology revolutionizes infrastructure", https://www.ibm.com/industries/government/infrastructure-citizen-services, Accessed May 20, 2022, pp. 1-6.

Liao et al., "Coopertaive Ramp Merging Design And Field Implementation: a Digital Twin Approach Based on Vehicle-To-Cloud Communication", https://ieeexplore.ieee.org/document/9502522, ResearchGate, IEEE Transactions on Intelligent Transportation Systems, Jul. 2021, pp. 1-12.

Matheson, "Helping autonomous vehicles see around corners", https://news.mit.edu/2019/helping-autonomous-vehicles-see-around-corners-1028, MIT News on Campus and Around the World, Oct. 27, 2019, pp. 1-6.

Mclellan, "What is V2X communication? Creating connectivity for the autonomous car era", https://www.zdnet.com/article/what-is-v2x-communication-creating-connectivity-for-the-autonomous-car-era/, ZDNet, Autonomous Vehicles and the Enterprise, Nov. 4, 2019, pp. 1-19.

Razak et al., "Transmitting Speed And Distance Data Over Long-Range Communication For Connected Vehicles", DOI:https://doi.org/10.35741/issn.0258-2724.57.1.1, Journal Of Southwest Jiaotong University, vol. 57, No. 1, Feb. 2022, pp. 1-11.

Bouman et al., "Turning Corners into Cameras: Principles and Methods", MIT, Dept. of Electrical Engineering and Computer Science, Accessed Aug. 2, 2022, pp. 1-9.

Author Unknown, Autopilot Tesla, https://www.tesla.com/autopilot, Accessed Aug. 2, 2022, pp. 1-7.

Caughill, "A New Company is Making the "Brain" for Self-Driving Cars", Futurism, https://futurism.com/a-new-company-is-making-the-brain-for-self-driving-cars, Jun. 29, 2017, pp. 1-6.

* cited by examiner

SPEED-AWARE ADAPTATION OF VEHICLE COMMUNICATIONS NETWORKS

BACKGROUND

Embodiments relate generally to the field of wireless communication networks between a vehicle and the surroundings, and more specifically, to adapting a vehicle communication network range based on an awareness of vehicle speed.

In the current environment of intelligent cars, autonomous driving and intelligent transportation systems, vehicles may obtain many forms of traffic and roadway information such as cloud services, real-time road conditions, road information, and pedestrian information through mobile networks or short-range network communications. Through the information that may be provided to these communication networks and even the forming of these communication networks, improved driving safety and traffic efficiency, along with reduction of traffic congestion on roads, may be achieved. The current status of a vehicle, such as current speed or other information about the vehicle itself, may also be monitored and the information, and even the communication networks themselves, may be adjusted based on vehicle information that may be obtained.

SUMMARY

An embodiment is directed to a computer-implemented method for adapting a vehicle communication network range based on an awareness of vehicle speed. The method may include identifying a plurality of devices within a recommended range of a vehicle. The method may also include obtaining a current driving environment from the plurality of devices. In addition, the method may include calculating a required range for a communications network based on the current driving environment and determining required devices within the required range. Lastly, the method may include dynamically creating the communications network when the required range is greater than the recommended range, where the communications network includes the vehicle, the plurality of devices within the recommended range and the required devices.

In another embodiment, the method may include monitoring the current driving environment and updating the required range in response to changes in the current driving environment.

In a further embodiment, the method may include identifying a second vehicle in the current driving environment. In this embodiment, the method may also include creating a vehicle cohort, where the vehicle cohort includes the vehicle and the second vehicle and updating the current driving environment based on a combined status of the vehicle cohort.

In yet another embodiment, the identifying the plurality of devices within the recommended range of the vehicle may include determining that the vehicle and the plurality of devices within the recommended range are not connected to the communications network and dynamically creating the communications network, where the communications network includes the vehicle and the plurality of devices within the recommended range.

In another embodiment, the calculating the required range for the communications network may include creating a digital twin instance of the vehicle. In this embodiment, the calculating the required range for the communications network may also include simulating the current driving environment using the digital twin instance and updating the required range based on a digital twin simulation output.

In a further embodiment, a machine learning model that predicts a required distance for a vehicle communications network based on vehicle health parameters and roadway conditions is used to determine the required range.

In yet another embodiment, the current driving environment may be selected from a group consisting of: health of the vehicle, roadway surface conditions in the current driving environment, weather conditions in the current driving environment, traffic conditions in the current driving environment.

In addition to a computer-implemented method, additional embodiments are directed to a system and a computer program product for adapting the range of a vehicle communication network based on an awareness of vehicle speed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
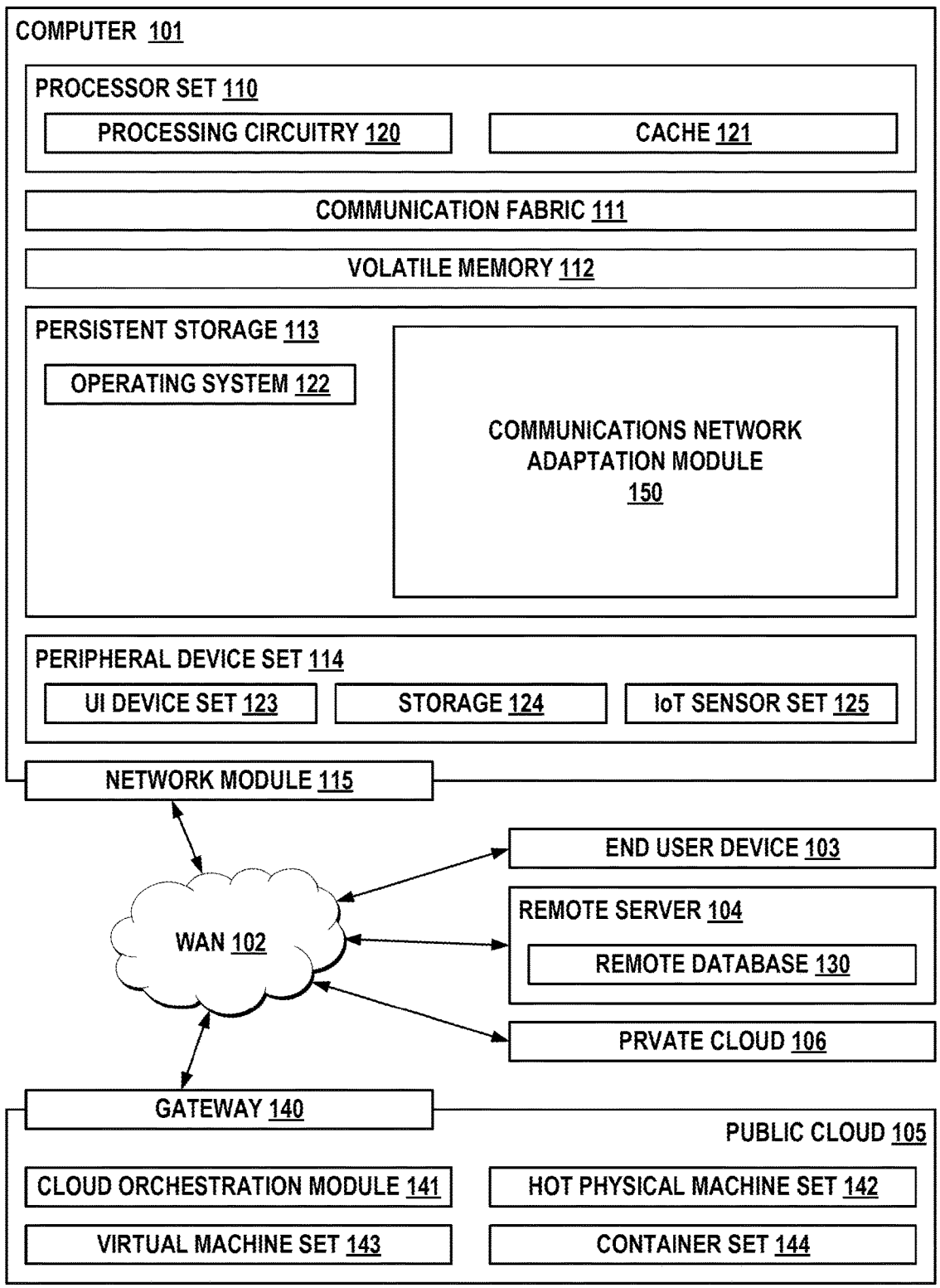
FIG. 1 depicts a block diagram of an example computer system in which various embodiments may be implemented.

As the transportation system may become more intelligent and more Internet-enabled devices may be deployed in vehicles and on roadways, including devices mounted to roadside objects such as road signs or traffic signals, communication networks consisting of these devices may become more prevalent. Since all of these devices may have useful information to share throughout the network and potentially to a cloud server, a local or edge server or other remote entity, it may be important to determine which devices may form a communication network or may become members in such an ad-hoc network. In particular, a vehicle, whether autonomous or not, may benefit from real-time information about driving conditions or vehicle health in order to make decisions about which roads or areas to avoid or simply to understand the condition of a roadway surface or another vehicle. In forming a communication network, a group of devices acting in concert or through a centralized mechanism such as a server in the cloud or local, may have difficulty determining which devices should be included in the network because a range for the network may be based on standard conditions and this may not be accurate based on the speed of one or more vehicles.

It may be useful to provide an automated method or system that may adapt the range of a vehicle communication network based on an awareness of vehicle speed. Such a method may have an awareness of the speed of the vehicle, as well as many aspects of the vehicle's condition, e.g., a fuel or battery level or a level of wear on tires. Using such information, a vehicle or any connected device may form a communication network with an extended range that may take real-time conditions into account. Roadway conditions may also be considered when determining the communication network, for example if the road surface is icy, then the slippery conditions may affect the required range of the network. Such a method or system may improve driver safety or the effectiveness of machine learning in the case of an autonomous vehicle. The method may also improve the effectiveness of computer networks in the context of transportation, including the accuracy and efficiency of the information that may be available at any point in the network, including the cloud server or local hardware that may exist. Such a method or system may optimize the amount of data that a vehicle may have to analyze to make driving decisions and consume less power. Such a method or system may initiate creation of a temporary communication network dynamically to analyze the information and maintain the speed of the vehicle and may further analyze the health of the vehicle, vehicle capabilities, weather conditions, road surface and condition, and traffic conditions to identify whether the communication distance range should be altered for the selected vehicle. The method or system may also identify an aggregated communications distance range using the network that is created based on the relative positions of the vehicles in a multi-vehicle cohort.

Referring to FIG. 1, computing environment 100 contains an example of an environment for the execution of at least some of the computer code involved in performing the inventive methods, such as communications network adaptation module 150. In addition to communications network adaptation module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and communications network adaptation module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in communications network adaptation module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in communications network adaptation module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth® is a registered trademark of Bluetooth SIG, Inc.) connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated userspace instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to adapt a communications network for a vehicle by using real-time conditions to determine a required range for the network. In particular, the communications network adaptation module 150 may identify a vehicle and communications network in the local area within a recommended range from the vehicle. The recommended range may be preconfigured or calculated based on standard variables based on the condition of the vehicle or the surrounding roadways. For instance, a vehicle that may be traveling at a specific speed under certain driving conditions may be able to communicate with devices that are within a specific distance of the vehicle. In another embodiment, an existing communications network may be identified with respect to a vehicle and, by identifying the devices that may be connected to the existing communications network and the locations of the devices, a range may be determined as the recommended range.

At this point, the current driving environment may be obtained from the devices in the network. The environment may include health information about the vehicle, e.g., vehicle speed, level of remaining gasoline (or battery in the case of an electric vehicle), level of tire wear, or any other information that may be relevant to the current condition of the vehicle. In addition to vehicle health information, driving conditions may also be collected, including the condition of roadways or weather information. One of ordinary skill in the art may recognize that there are many methods of collecting information about the driving environment and many aspects that may be relevant to driving conditions.

From the collected information, a prediction may be made about the required range of the communications network. In an embodiment, a machine learning model may be used to make this prediction. For instance, if a vehicle is traveling at a high speed and the conditions of the roadway are slippery, it may be predicted that the communications network range needs to be extended. In this case, the prediction of the required range would exceed the current range, in the case of an existing network, or a recommended range in the event that default settings had been used as described above. If the required range were greater than the recommended, or current, range, then additional devices that may be within the predicted required range may be added to the communications network. These devices may also include additional vehicles from which information may be added. It is further not required that a single vehicle establish or maintain a communications network, a vehicle cohort may be substituted for the single vehicle such that information is shared among the cohort and range may be predicted and maintained for the entire cohort.

Such a method or system of predicting an extended range for a communications network may allow the network to adapt to current information and increase efficiency of communication and also improve the accuracy of information available to any one vehicle. This method or system may further improve driver and passenger safety in both autonomous and manual driving conditions and also increase efficiency of data processing in vehicle communications networks by limiting or focusing the volume of data that may be gathered and analyzed.

Figure 2:
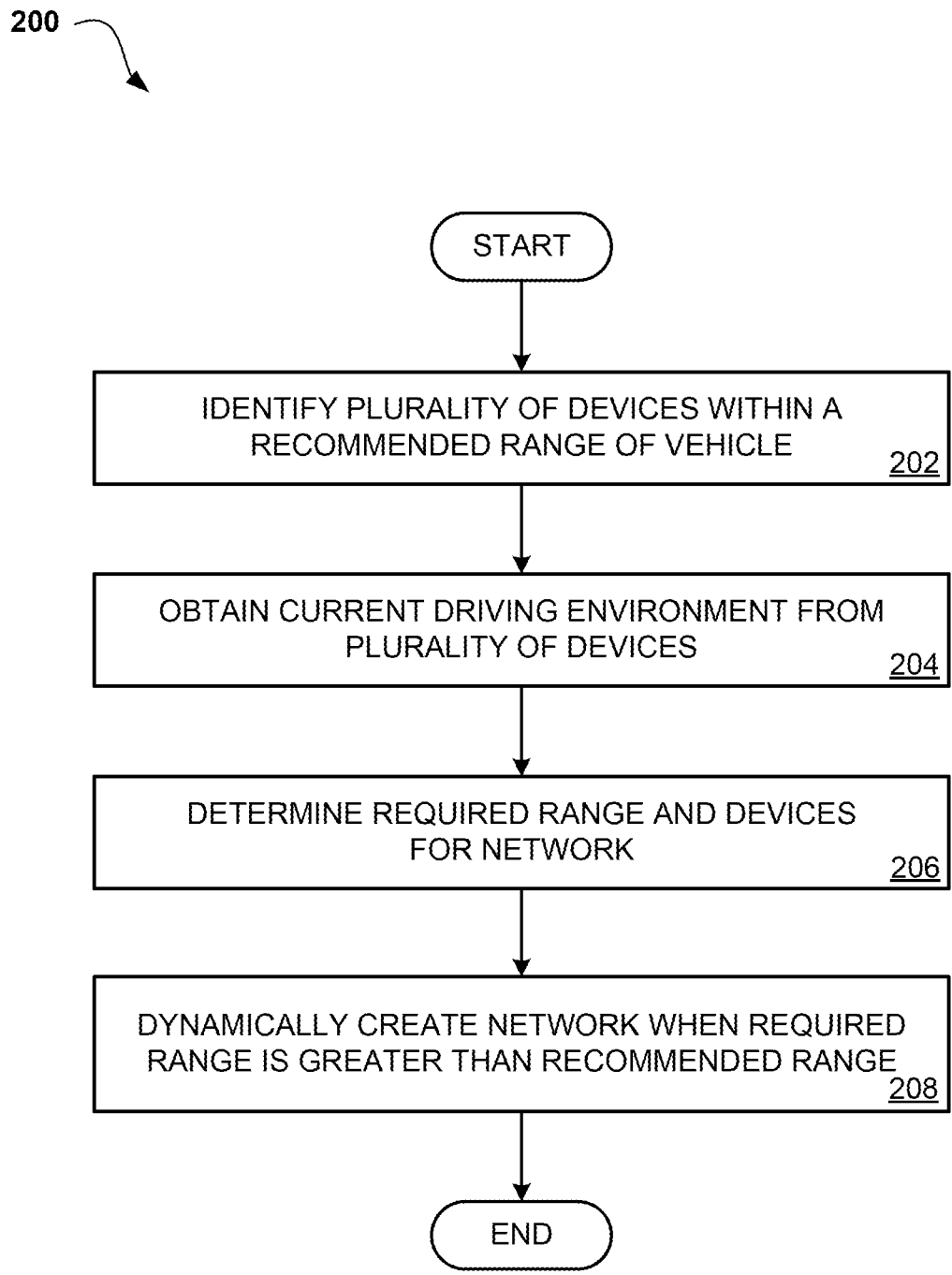
FIG. 2 depicts a flow chart diagram for a process that adapts a vehicle communication network based on an awareness of vehicle speed according to an embodiment.

Referring to FIG. 2, an operational flowchart illustrating a process 200 that adapts a vehicle communication network based on an awareness of vehicle speed is depicted according to at least one embodiment. At 202, a plurality of devices that are within a recommended range of the vehicle may be identified. To be able to identify the devices, a vehicle may look to a local server or a cloud server or any other location to gather information about devices that may be deployed in the area that may be local to the location of the vehicle. In addition, a recommended range may be calculated based on a preconfigured default distance from the vehicle or based on known vehicle conditions, such as learned information about the normal habits of the driver or other known information that may be gathered through prior interactions of the vehicle, driver and roadways. Using this recommended range, the servers or other information repositories, such as databases or other lists, may be searched to determine the devices that may be within the recommended range from the vehicle location. However, it is not required to calculate a recommended range to determine the devices. In an embodiment, if there is already a communications network connected, then the location of the devices in the network may be used to determine a current range, which may function as the recommended range.

Devices as mentioned herein may include other vehicles or devices that may be affixed to permanent fixtures, such as traffic signals or mile markers or telephone poles or road signs. Devices may also be sensors attached to the roadway itself or may be mobile devices that may currently be in the local area. In addition to vehicles and other devices in the driving environment, there may also be a local, or edge server, connected to the network or a cloud server that may or may not be present in the environment but contains information that is important to the network or may act as a hub in control of the network. With respect to the communications network, it is not required that any specific protocol, such as UDP or TCP, be used, nor is it required to use a specific technology such as ultra-wideband (UWB), described below, or radar. It is only required that devices communicate with one another and pass information within the communications network. In addition, there is no requirement that the communications network is connected to the Internet or some other Wide Area Network (WAN), such as WAN 102. While local or cloud servers may need to connect outside the local network for general information such as traffic alerts or other bulletins, this is not required as roadside sensors, for instance, map provide the most updated information needed for a vehicle.

Ultra-wideband is a short-range, wireless communication protocol that allows for high-precision localization at distances typically up to 200 meters. When combining multiple UWB radios into a single network, UWB technology can be used to identify the exact position of mobile UWB-equipped consumer devices in the immediate vicinity. Ultra-wideband technology makes use of a very high bandwidth, between 3.1 GHz and 10.6 GHz, and while other radio technologies split the available bandwidth into smaller chunks in favor of higher data rates or using multiple data channels at the same time, UWB dedicates the entire available bandwidth to the transmission of very short radio wave pulses. The pulse duration of UWB of only two nanoseconds is only a fraction of the pulse durations being used for data transmission in other wireless radio applications and, as only very few UWB pulses are needed for an accurate measurement, UWB radios can be used to almost instantly provide localization information or perform real-time live tracking of moving objects, without suffering the drawbacks of long latencies. As a result, UWB has the advantage of high accuracy at short distances and also virtually no signal interference in the high-frequency UWB spectrum. As a result, UWB may be a superior technology over more traditional standards, e.g., Bluetooth®, Wi-Fi, NFC/RFID or Geofence/GPS, for connecting vehicles or devices in certain situations, such as the vehicle scenarios described herein.

In addition to the above, it is not required that the range of a communications network and the current environment as described below are for a single vehicle. While the current conditions may expand the network range and add devices to the network, the calculations as described herein may be for a cohort of vehicles and not necessarily a single vehicle. As an example, a business may have multiple vehicles on the road in a similar area and wish to share information about the weather or road conditions or even local traffic issues. The vehicles may establish a network with one another that may function as the communications network. Similarly, there is no limit on the number of devices in a network or the type of devices in a network. It is only required to have a vehicle, or cohort of vehicles, present to establish a communications network with devices within the range as described above.

It should be noted that all collection of information from a vehicle or other source that may personally identify a human driver or any other user or is sensitive in any other way requires the informed consent of all people whose information may be collected and analyzed for the purposes of the invention. Consent may be obtained in real time or through a prior waiver or other process that informs a subject that their information may be captured by a device or other process and that the information may be used to predict a required range for a communications network and the devices that may therefore be needed in the communications network. The information owner is free to decide at any time to revoke consent for use of sensitive information as these settings are permanently retained to keep the communications network adaptation module 150 updated with the latest information and also allow the owner of the information complete control over their informed consent to use sensitive information in the course of the invention. The consent described here may also refer to allowing some, or any, data relating to an information owner's vehicle from being sent to a local server, cloud server or any other location. The owner has complete control on the transmission of information that may be sensitive or personally identify the owner of the information beyond the vehicle.

At 204, once the current, or recommended range, has been established, then detailed information about the current environment, such as vehicle details including speed or roadway conditions such as wet/dry or the presence of snow/ice, may be obtained using the communications network. This step may or may not be done in tandem with 202, meaning that should a communications network already exist, then detailed information that may be available depending on the location and type of device may be gathered at the same time as determining the location of the device for the purpose of calculating recommended or current range of the network. As mentioned above, the device may be a sensor that is directly attached to the road surface and may therefore indicate specific conditions about the roadway. In another example, the device may be attached to a road sign and be able to transmit data about traffic at a specific place or the general weather conditions. In addition to physical characteristics of the travel infrastructure, e.g., roads or bridges, or traffic/weather conditions, the information obtained at this step may include details about the health of the vehicle, including any other vehicles that may be connected to the network as part of a vehicle cohort. This may include the current speed of the vehicle, as well as the condition of various components of the vehicle, such as whether tire tread wear and/or air level are low or not. It is important to note that a vehicle is not limited to providing information about its own health, vehicles may also provide information about driving conditions, including possible audio, video or text reports of traffic or other conditions that a driver or passenger may initiate from the vehicle or from a mobile device that may be connected to the driver or passenger. Also included in these reports may be automated reports that an autonomous vehicle may be programmed to initiate in the event of an issue. One of ordinary skill in the art may recognize that information about the current environment may take many forms and may be communicated in multiple ways over a communications network to a variety of devices, including those deployed in the field and also any connected servers, whether local, or edge, servers or in the cloud.

At 206, a required range for a communications network may be predicted from obtained information regarding the current environment for comparison to the recommended, or current, range that may be calculated in 202. One example scenario for the current driving environment may include a vehicle running at low speed, e.g., 15-25 miles per hour (mph), in good weather. In this scenario, obstacle detection from only vehicles in the immediate vicinity may be required and with the vehicle mostly in control of its speed, it may be possible to adjust speed limits and communication distance range based on road infrastructure. In another example, the vehicle may be running at a mid-range to high speed, e.g., 45-65 mph. In this example, an aggregated communication medium involving both short-range and long-range communications may be established while also considering the angular velocity of the vehicle. In this scenario, a temporal aggregated communications network may be established with ultra-wideband (UWB) technology, which may provide more freedom of movement for the vehicles as obstacles can be detected from further away and at higher speeds. However, the cost of greater freedom of movement may be less certainty as to the location of the vehicle as well as the position of moving obstructions such as pedestrians or bicyclists. In a further example, a vehicle may be running at high speed, e.g., 55 mph or more, with poor visibility. In this scenario, both short-range and long-range communications may also be temporally aggregated along with the angular velocity of the vehicle and an aggregated communication medium involving both UWB technology and radar may be established that could allow for the same freedom of movement while also providing obstacle detection from greater distances.

In an embodiment, a supervised machine learning model may be trained to predict the required range for a communications network based on the current vehicle speed and current environment information that may be obtained. One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include known information about driving habits of specific users or performance of specific vehicles. For instance, prior interactions of the vehicle with a specific location while under the control of a specific driver may be analyzed to understand what information the driver may need to understand the current environment. Another possibility may be vehicle manufacturer specifications with regard to braking at certain speeds or in certain conditions. Further training data may include typical reaction time for a human driver in the event of a problem on the roadway or in specific weather conditions. It should be noted that training data may include any of the above scenarios and also a variety of vehicle health parameters and levels, roadway conditions, weather conditions and traffic conditions. The training data may be collected from a single example user/vehicle or a group/cohort of users/vehicles, with user consent required prior to collection of any data from human users, as mentioned above. The prediction results may be stored in a database so that the data is most current, and the output would always be up to date.

In another embodiment, a digital twin simulation of the vehicle may be used in the prediction of the required range of the communications network for determining vehicle health. A digital twin is a virtual model designed to accurately reflect a physical object. The object being studied, e.g., a vehicle, may be outfitted with various sensors related to vital areas of functionality which produce data about different aspects of the physical object's performance, such as fuel or battery level, tire wear or air level, oil levels or other engine performance metrics, temperature, weather conditions, etc. This data may then be relayed to a processing system and applied to the digital copy. Once informed with such data, the virtual model can be used to run simulations, study performance issues and generate possible improvements, all with the goal of generating valuable insights, all of which may then be applied back to the original physical object.

Although simulations and digital twins both utilize digital models to replicate various processes, a digital twin is actually a virtual environment and while a simulation typically studies one particular process, a digital twin can itself run any number of useful simulations in order to study multiple processes. Digital twins are designed around a two-way flow of information that first occurs when object sensors provide relevant data to the system processor and then happens again when insights created by the processor are shared back with the original source object. By having better and constantly updated data related to a wide range of areas, along with the added computing power that accompanies a virtual environment, digital twins are able to study more issues from far more vantage points than standard simulations and have greater ultimate potential to improve products and processes. Examples of the types of digital twins include component twins, which are the basic unit of digital twin or the smallest example of a functioning component, parts twins, which pertain to components of slightly less importance, asset twins, which study the interaction between components that work together, system (or unit) twins, which enable you to see how different assets come together to form an entire functioning system, and process twins, which are the macro level of magnification and reveal how systems work together to create an entire production facility, which may help determine the precise timing schemes that ultimately influence overall effectiveness.

At 208, in the event that the required range is greater than the current, or recommended range, a communications network based on the required range may be created by adding the required devices that have been determined in 206 to an existing communications network, if one exists, or by forming a new network that includes the vehicle, the plurality of devices within the current, or recommended, range and the required devices determined in 206. It should be noted that this step optionally includes monitoring of the current driving environment such that the communications network that is formed may adapt and add or remove devices as new information may be learned. For instance, if the vehicle changes speed dramatically, then new devices may be needed in a communications network to provide additional data about the surroundings and account for any changes to driving or weather or traffic conditions. Similarly, if an incident occurs within the vehicle, such as a punctured tire or the like, information that was previously not needed may now be critical and also this incident may be reported throughout the communications network and also through the Internet if a server is connected to the network, such that help may be summoned.

It should also be noted that the connection of the communications network may not be limited to only which devices should be connected together. Because different technologies, e.g., UWB as described above or radar, may be more appropriate in different conditions, such as the scenarios described above, the technology that may be used to connect to or from devices and vehicles may also be selected. For instance, in a high-traffic situation where many objects are close and the speed of the vehicle is low, UWB may be the choice for a connection, but in different situations, radar may be more appropriate. In addition to selecting a best method of connection, the network may be maintained by changing to different communication protocols as conditions change and more information about the current driving environment is known. In a multi-vehicle cohort scenario, this step may include coordinating the movements and status of vehicles within the cohort and also coordination of the protocol in use for each connection within the cohort and between the cohort and other devices that may be in the current driving environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for adapting a vehicle communication network range based on an awareness of vehicle speed, the method comprising:
    identifying a plurality of devices within a recommended range of a vehicle;
    obtaining a current driving environment from the plurality of devices;
    calculating a required range for a communications network using a machine learning model based on the current driving environment and vehicle parameters associated with the vehicle, the current driving environment including roadway conditions, and determining required devices within the required range; and
    dynamically creating the communications network when the required range is greater than the recommended range, wherein the communications network includes the vehicle, the plurality of devices within the recommended range and the required devices.

2. The computer-implemented method of claim 1, further comprising:
    monitoring the current driving environment; and
    updating the required range in response to changes in the current driving environment.

3. The computer-implemented method of claim 1, further comprising:
    identifying a second vehicle in the current driving environment;
    creating a vehicle cohort, wherein the vehicle cohort includes the vehicle and the second vehicle; and
    updating the current driving environment based on a combined status of the vehicle cohort.

4. The computer-implemented method of claim 1, wherein the identifying the plurality of devices within the recommended range of the vehicle further comprises:
    determining that the vehicle and the plurality of devices within the recommended range are not connected to the communications network; and
    dynamically creating the communications network, wherein the communications network includes the vehicle and the plurality of devices within the recommended range.

5. The computer-implemented method of claim 1, wherein the calculating the required range for the communications network further comprises:
    creating a digital twin instance of the vehicle;
    simulating the current driving environment using the digital twin instance; and
    updating the required range based on a digital twin simulation output.

6. The computer-implemented method of claim 1, wherein the current driving environment is selected from a group comprising: health of the vehicle, roadway surface conditions in the current driving environment, weather conditions in the current driving environment, traffic conditions in the current driving environment.

7. A computer system for adapting a vehicle communication network range based on an awareness of vehicle speed, the computer system comprising:
    one or computer processors;
    one or more computer-readable storage media;
        program instructions stored on the computer-readable storage media for execution by at least one of the one or more processors, the program instructions comprising:
        program instructions to identify a plurality of devices within a recommended range of a vehicle;
        program instructions to obtain a current driving environment from the plurality of devices;
        program instructions to calculate a required range for a communications network using a machine learning model based on the current driving environment and vehicle parameters associated with the vehicle, the current driving environment including roadway conditions, and determining required devices within the required range; and
        program instructions to dynamically create the communications network when the required range is greater than the recommended range, wherein the communications network includes the vehicle, the plurality of devices within the recommended range and the required devices.

8. The computer system of claim 7, further comprising:
    program instructions to monitor the current driving environment; and
    program instructions to update the required range in response to changes in the current driving environment.

9. The computer system of claim 7, further comprising:
    program instructions to identify a second vehicle in the current driving environment;
    program instructions to create a vehicle cohort, wherein the vehicle cohort includes the vehicle and the second vehicle; and
    program instructions to update the current driving environment based on a combined status of the vehicle cohort.

10. The computer system of claim 7, wherein the program instructions to identify the plurality of devices within the recommended range of the vehicle further comprises:
    program instructions to determined that the vehicle and the plurality of devices within the recommended range are not connected to the communications network; and
    program instructions to dynamically create the communications network, wherein the communications network includes the vehicle and the plurality of devices within the recommended range.

11. The computer system of claim 7, wherein the program instructions to calculate the required range for the communications network further comprises:
   program instructions to create a digital twin instance of the vehicle;
   program instructions to simulate the current driving environment using the digital twin instance; and
   program instructions to update the required range based on a digital twin simulation output.

12. The computer system of claim 7, wherein the current driving environment is selected from a group comprising: health of the vehicle, roadway surface conditions in the current driving environment, weather conditions in the current driving environment, traffic conditions in the current driving environment.

13. A computer program product for adapting a vehicle communication network range based on an awareness of vehicle speed, the computer program product comprising:
   a computer readable storage device having program instructions embodied therewith, the program instructions executable by a processor to cause the processor to perform a method comprising:
   identifying a plurality of devices within a recommended range of a vehicle;
   obtaining a current driving environment from the plurality of devices;
   calculating a required range for a communications network using a machine learning model based on the current driving environment and vehicle parameters associated with the vehicle, the current driving environment including roadway conditions, and determining required devices within the required range; and
   dynamically creating the communications network when the required range is greater than the recommended range, wherein the communications network includes the vehicle, the plurality of devices within the recommended range and the required devices.

14. The computer program product of claim 13, further comprising:
   monitoring the current driving environment; and
   updating the required range in response to changes in the current driving environment.

15. The computer program product of claim 13, further comprising:
   identifying a second vehicle in the current driving environment;
   creating a vehicle cohort, wherein the vehicle cohort includes the vehicle and the second vehicle; and
   updating the current driving environment based on a combined status of the vehicle cohort.

16. The computer program product of claim 13, wherein the identifying the plurality of devices within the recommended range of the vehicle further comprises:
   determining that the vehicle and the plurality of devices within the recommended range are not connected to the communications network; and
   dynamically creating the communications network, wherein the communications network includes the vehicle and the plurality of devices within the recommended range.

17. The computer program product of claim 13, wherein the calculating the required range for the communications network further comprises:
   creating a digital twin instance of the vehicle;
   simulating the current driving environment using the digital twin instance; and
   updating the required range based on a digital twin simulation output.

* * * * *